Sept. 8, 1964 P. P. DUNCANSON 3,147,812
PLOW ATTACHMENT
Filed May 24, 1962 2 Sheets-Sheet 1

INVENTOR.
Peter P. Duncanson
BY
Learman, Learman & McCulloch
ATTORNEYS

Sept. 8, 1964 P. P. DUNCANSON 3,147,812
PLOW ATTACHMENT
Filed May 24, 1962 2 Sheets-Sheet 2
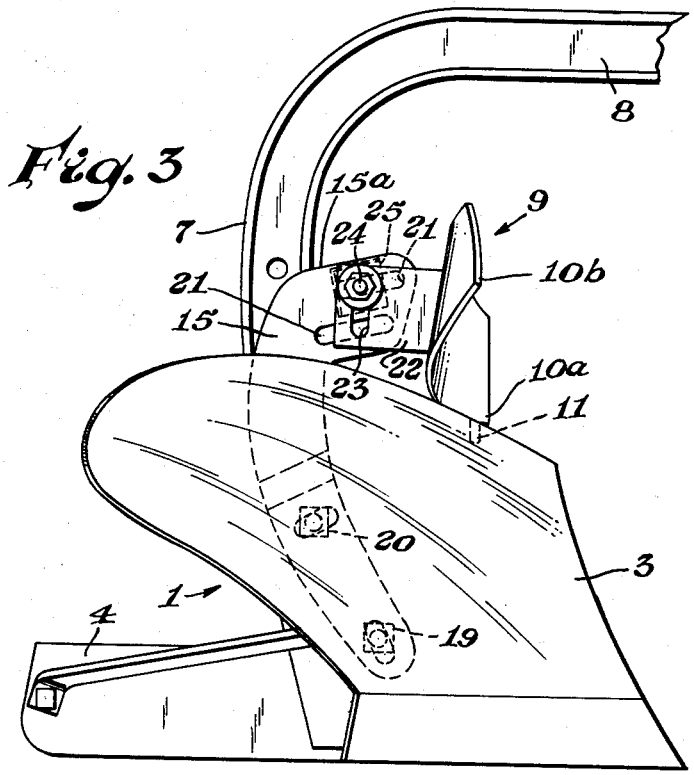
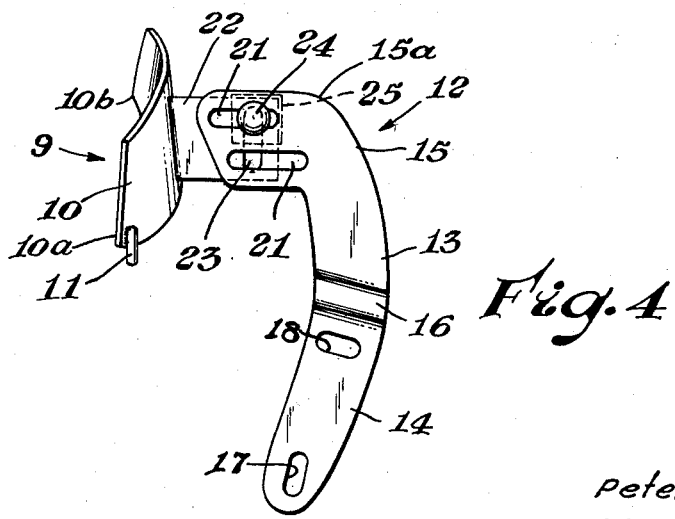
INVENTOR.
Peter P. Duncanson
BY
Lyman, Lyman & McCulloch
ATTORNEYS United States Patent Office 3,147,812
Patented Sept. 8, 1964

3,147,812
PLOW ATTACHMENT
Peter P. Duncanson, 415 Wells St., Caro, Mich.
Filed May 24, 1962, Ser. No. 197,514
4 Claims. (Cl. 172—736)

This invention relates to farm implements and more particularly to an attachment for use in conjunction with a plowshare for the purpose of enabling cover crops, trash and litter on a field to be turned underground as the field is plowed. The construction herein disclosed is an improvement over the construction disclosed in Patent No. 3,036,643, issued May 29, 1962.

A field to be plowed quite often contains a cover crop or quite an accumulation of trash in the form of leaves, sticks, stones, and stalks of previously harvested crops on its upper surface. If this material is permitted to remain on the surface of the field it may interfere with the planting and cultivation of subsequent crops. Accordingly, it has been proposed heretofore to equip a plow with an attachment which will engage and deflect such material in a manner to insure its being turned underground. While the prior devices have been satisfactory in many respects, they have had some shortcomings in that they could not be mounted on a large number of different kinds of plows and their mounting devices included a fairly large number of parts.

An object of the invention is to provide a trash covering attachment for a plow which is substantially universal in the sense that it is adapted for use with any one of a large number of different kinds of plows.

Another object of the invention is to provide an attachment of the kind referred to having simplified mounting means for mounting it on a plow.

Another object of the invention is to provide an attachment of the kind referred to which is capable of adjustment relative to the plow with which it is associated.

A further object of the invention is to provide a trash covering plow attachment having mounting means which are adjustable so as to render the attachment capable of functioning effectively to turn under all kinds of trash, stalks, and cover crops, while not hampering the turning of the furrow slice.

Other objects and advantages of the invention will be referred to specifically or will become apparent from the following description when it is considered in conjunction with the appended claims and the accompanying drawings, in which:

FIGURE 3 is a side elevational view of the plow and the attachment and illustrating the mounting means of the latter; and FIGURE 4 is a perspective view of the attachment and its mounting means.

Figure 1:
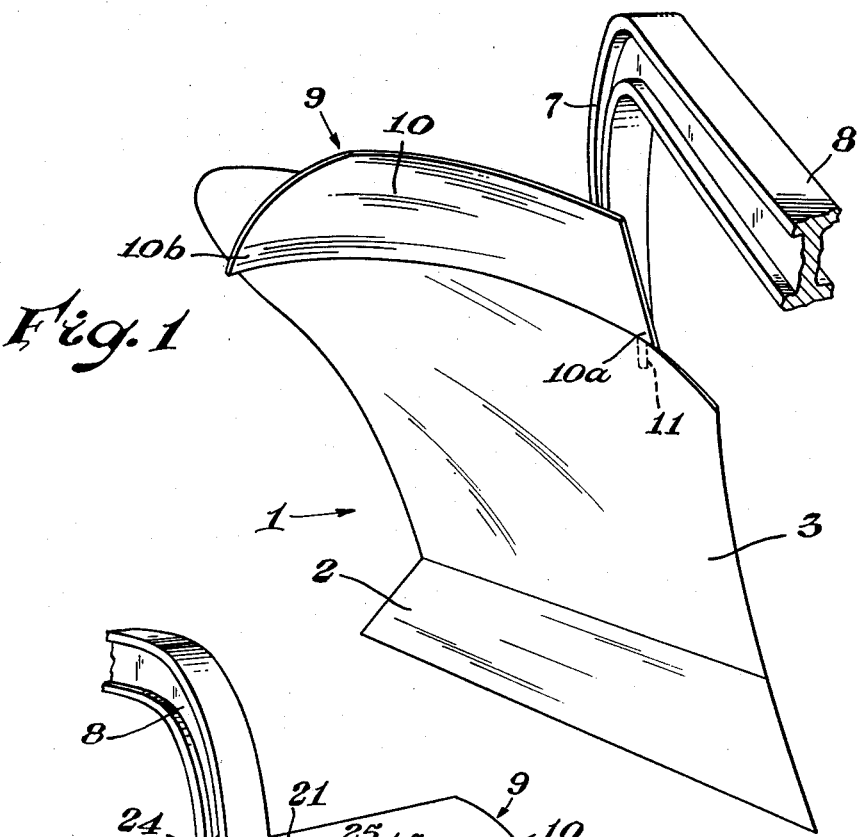
FIGURE 1 is a fragmentary, front perspective view illustrating a plow equipped with an attachment constructed in accordance with the invention.

Apparatus constructed in accordance with the invention is adapted for use in conjunction with a conventional plow 1 having a plowshare 2 mounted on a concave moldboard 3 in any suitable and conventional manner. The plow is also equipped with a rearwardly extending landslide 4 braced by a suitable brace bar 5. The plowshare mounting means comprises a mounting bracket 6 connected in a conventional manner to the portion 7 of plowbeam 8 in a known manner, and the moldboard 3 is braced from the bracket 6 by a suitable brace bar 8a.

Figure 2:
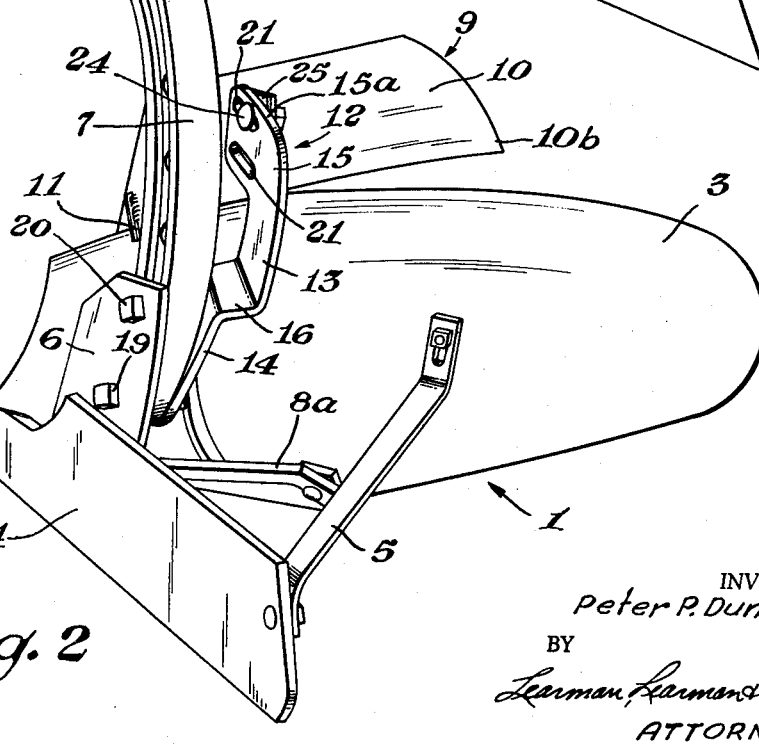
FIGURE 2 is a rear perspective view similar to FIGURE 1.

An attachment constructed in accordance with the invention is indicated generally by the reference character 9 and comprises an arcuate plate member 10 mounted above the upper edge of the moldboard 3 and having welded or otherwise secured adjacent its leading end a locating device 11 which, in the preferred embodiment of the invention, comprises a pin which is cylindrical so as to present an arcuate surface to the moldboard. The pin 11 projects below the lower edge of the plate 10 and is adapted to engage the rear face of the upper edge of the moldboard 3 as is best shown in FIGURE 2. The plate 10 is mounted with the lower edge of its leading end 10a resting on the upper edge of the leading end of the moldboard 3 so that the leading end 10a forms a smooth continuation of the latter, as is shown in FIGURE 1, and extends laterally from the plane of the beam portion 7 in the same general direction as does the moldboard 3. The curvature of the plate 10 is such that it is concave forwardly, as is best shown in FIGURE 1, so that the trailing end 10b of the plate 10 will be located forwardly of the trailing end of the moldboard when the plate is mounted on the plow.

The position of the plate 10 relative to the moldboard 3 will be determined by several factors such, for example, as the kind of plowing being done, the kind of soil being plowed, and the kind of trash or cover crop on the surface of a field. In order to enable the attachment 9 to function most efficiently under all conditions, it is preferred that the plate 10 be mounted for substantially universal adjustment relative to the plow 1.

A preferred embodiment of adjustable mounting means for the plate 10 is designated generally by the reference character 12 and comprises a first bracket member 13 having a mounting section 14 and an attaching section 15 which is substantially parallel to the section 14 but laterally offset therefrom by an intermediate web 16. The mounting section 14 is provided with a pair of elongated slots 17 and 18 for reception of nut and bolt assemblies 19 and 20, respectively, and these assemblies preferably are the means by which the mounting bracket 6 is secured to the beam portion 7. The slot 17 is elongated vertically and the slot 18 is elongated fore and aft of the direction of movement of the plow, for a purpose presently to be explained.

The attaching section 15 terminates in a forwardly projecting arm 15a having a pair of elongated, substantially parallel slots 21 which extend fore and aft of the arm 15a. The arm 15a is adapted to be placed side by side with a bracket or arm 22 which is welded or otherwise suitably fixed to the rear face of the plate 10. The bracket 22 has a vertically elongated slot 23 therein through which, and through one of the slots 21, extends a nut and bolt assembly 24. If desired, a wedge-shaped shim 25 may be interposed between the arms 15a and 22, the shim having an opening therein to accommodate the bolt 24.

When the trash covering apparatus has been mounted in the manner described, the plate 10 may be adjusted fore and aft with respect to the direction of travel of the plow because of the slots 18 and 21 in the mounting bracket 15. Vertical adjustment of the plate 10 may be effected either by relative movement between the mounting arms 15a and 22, due to the provision of the slot 23 in the latter, or by use of a selected one of the slots 21 in the arm 15a. Lateral movement of the plate 10, that is, movement towards and away from the plane of the beam portion 7, may be obtained by use or removal of the shim 25, or by rotation of the shim on the bolt 24.

In addition to the adjustments described, the trailing end of the plate 10 may be swung through an arc having its center at substantially the location of the pin 11 by loosening the nut and bolt assembly 24 and swinging the trailing end of member 10 as permitted by the slot 21 in the arm 15a. The arcuate configuration of the pin 11 will permit swinging of the plate 10 without substantially affecting the relative positions of the leading ends of the plate and the moldboard. Furthermore, the plate 10 may be rocked in a vertical plane by loosening the assemblies 19 and 20 and rocking the plate 10 as permitted by the slot 18 in the mounting section 14. Moreover, the plate 10 may be rocked about a substantially horizontal axis, or vertically about its leading edge 10a, by loosening the assembly 24 and rocking the arm member 22 as permitted by the slots 21 and 23.

As a result of the multiple adjustments capable of being effected among the several mounting parts, the plate 10 is substantially universally adjustable relatively to the moldboard 3 so as to enable placement of the plate 10 in its most efficient position for the particular kind of plowing to be done and with respect to the kind of trash or cover crop on the surface of the field. In addition, the adjustability of the plate mounting means enables the plate to be mounted on any one of a large number of different kinds of plows and to be secured to the plow beam by the same means that function to mount the plow on the plow beam. This construction is considerably simpler than known constructions and utilizes many fewer parts than have heretofore been required.

In the operation of the apparatus, the plow 1 will be drawn through a field by a tractor of the like in the conventional manner to turn the earth. A slice of earth, together with its cover crop or other trash, will slide upwardly and outwardly along the moldboard 3 and the cover or trash will be moved upwardly until it is engaged by the plate 10 and tumbled forwardly so as to lie in the path of earth being turned by the moldboard 3. The rocking force thus exerted on the plate 10 will be counteracted by the mounting bracket members and also by the locating pin 11, so as to prevent inadvertent adjustment of the plate 10.

The disclosed embodiment is representative of a presently preferred form of the invention, but is intended to be illustrative rather than definitive thereof. The invention is defined in the claims.

I claim:

1. An attachment for a plow having a share and a moldboard with a leading end and a trailing end and means mounting said plow on a plow beam, said attachment comprising a plate member having a leading end and a trailing end, said leading end of said plate member being adapted for location adjacent to the leading end of said moldboard and above the latter, and the trailing end of said plate member being adapted to be positioned forwardly of said moldboard in the direction of movement of said plow; a locating device secured to said plate member at its leading end and adapted to be positioned rearwardly of said moldboard in engagement therewith, said device presenting an arcuate surface to said moldboard so as to enable swinging movement of said plate member in an arc having a center at said device without affecting the position of the leading end of the plate member relative to said moldboard; first arm means connected at one end directly to said plate member; second arm means having means at one end for direct connection to said plow mounting means; and adjustable means connecting the other ends of said first and second arms to one another for adjustment of said plate member in two divergent horizontal planes and in at least one vertical plane, whereby said plate member is universally adjustable relatively to said moldboard.

2. The attachment set forth in claim 1 wherein the means at said one end of said second arm means comprises slots for pivotally and slideably accommodating said plow mounting means.

3. The attachment set forth in claim 1 wherein said adjustable means includes a rotatable, wedge-shaped shim interposed between said first and second arm means.

4. The combination with a plow having a share and moldboard with a trailing end and a leading end and means mounting said plow on a plow beam, of an attachment for use with said moldboard in turning trash under soil as said plow is drawn through a field, said attachment comprising a plate member having a leading end and a trailing end, said leading end being located adjacent to and above the leading end of said moldboard; a positioning device mounted on said plate member at the leading end thereof and depending therefrom for engagement with the rear face of said moldboard, said device presenting an arcuate surface to said moldboard so as to enable said plate member to be swung in an arc having a center at said device without affecting the position of the leading end of said member relative to said moldboard; first arm means connected at one end directly to said plate member; second arm means; means at one end of said second arm means directly connecting the latter to said plow mounting means; and adjustable means connecting the other ends of said first and second arms to one another for adjustment of said plate member in two divergent horizontal planes and in a vertical plane, whereby said plate member is universally adjustable relatively to said moldboard.

References Cited in the file of this patent

UNITED STATES PATENTS

| | | |
|---|---|---|
| 272,701 | Johnson | Feb. 20, 1883 |
| 2,672,805 | Logenbach | Mar. 23, 1954 |
| 2,829,580 | Bauer | Apr. 8, 1958 |
| 2,915,131 | Yetter | Dec. 1, 1959 |
| 2,950,771 | Yetter | Aug. 30, 1960 |
| 2,953,211 | Altgelt et al. | Sept. 20, 1960 |
| 3,036,643 | Duncanson | May 29, 1962 |